(12) United States Patent
Deptolla (10) Patent No.: US 8,911,017 B2
(45) Date of Patent: Dec. 16, 2014

(54) MOTOR VEHICLE SEAT

(75) Inventor: Bernd Deptolla, Niedernwöhren (DE)

(73) Assignee: Faurecia Autositze GmbH, Stadthagen (DE)

( * ) Notice: Subject to any disclaimer, the term of this patent is extended or adjusted under 35 U.S.C. 154(b) by 539 days.

(21) Appl. No.: 13/156,054

(22) Filed: Jun. 8, 2011

(65) Prior Publication Data

US 2011/0304184 A1 Dec. 15, 2011

(30) Foreign Application Priority Data

Jun. 11, 2010 (DE) .......................... 10 2010 023 546

(51) Int. Cl.
*B60N 2/30* (2006.01)
*B60N 2/36* (2006.01)

(52) U.S. Cl.
CPC ............ *B60N 2/3031* (2013.01); *B60N 2/3065* (2013.01); *B60N 2/309* (2013.01)
USPC .......................................... 297/334; 297/341

(58) Field of Classification Search
USPC ................................................ 297/334, 341
See application file for complete search history.

(56) References Cited

U.S. PATENT DOCUMENTS

| | | | |
|---|---|---|---|
| 6,196,613 B1 * | 3/2001 | Arai .............................. | 297/334 |
| 7,686,389 B2 * | 3/2010 | Yamada ........................ | 297/334 |
| 7,878,592 B2 * | 2/2011 | Yamada et al. ........... | 297/334 X |
| 7,891,737 B2 * | 2/2011 | Mather et al. ................. | 297/334 |

* cited by examiner

*Primary Examiner* — Anthony D Barfield
(74) *Attorney, Agent, or Firm* — Jennifer S. Stachniak; Robert W. Becker (57) ABSTRACT

A motor vehicle seat having a sitting position and a backrest, which can be converted out of a sitting position into a cargo position in which they are essentially disposed in a common horizontal plane. The seat has a first arresting device for the sitting position of the backrest, a second arresting device for the sitting position of the sitting portion, and a third arresting device. The sitting portion and the backrest are biased into their cargo position, wherein after release of the first arresting device the backrest is pivoted in a direction toward the cargo position, against the third arresting device, and into a stand-by position, as a result of which the second arresting device is released and the sitting portion pivots into the cargo position, as a consequence of which the third arresting device is released and the backrest pivots out of the stand-by position into the cargo position.

6 Claims, 7 Drawing Sheets

MOTOR VEHICLE SEAT

The instant application should be granted the priority date of Jun. 11, 2010, the filing date of the corresponding German patent application 10 2010 023 546.6.

BACKGROUND OF THE INVENTION

The present invention relates to a motor vehicle seat having a sitting portion and a backrest, which can be converted out of a sitting position into a cargo position in which they are essentially disposed in a common horizontal plane.

Motor vehicle seats of this type are generally used as seats of a third row of seats, and serve, in their cargo position, to increase the loading or cargo surface of a motor vehicle. The amount of manipulation effort required during the conversion of the motor vehicle seat out of the sitting position and into the cargo position should be kept as low as possible.

DE 10 2004 007 863 A1 discloses a motor vehicle seat where the backrest and the sitting portion are kinematically coupled together, i.e. a movement of the backrest is transferred to the sitting portion, and vice versa. Due to this coupling, it is possible to convert the motor vehicle seat into its cargo position by means of a single handle, for example by pivoting the backrest or the sitting portion. Instead of the manual displacement, an appropriate, for example electric motor driven, drive can of course also be provided. The drawback of this relatively operator friendly solution is that it is necessary to provide a complicated coupling mechanism between the backrest and the sitting portion.

DE 102 39 112 B4 discloses a further motor vehicle seat where the backrest and the sitting portion are kinematically uncoupled, as a result of which the motor vehicle seat on the whole has a simple construction. The drawback of this solution is that the backrest and the sitting portion must be converted separately, one after the other, into the cargo position. Here, the simple seat construction is achieved at the expense of an increased manipulation effort.

It is an object of the present invention to provide a motor vehicle seat of the aforementioned general type where the backrest and the sitting portion are kinematically uncoupled, nonetheless the manipulation effort is minimal.

BRIEF DESCRIPTION OF THE DRAWINGS

This object, and other objects and advantages of the present application, will appear more clearly from the following specification in conjunction with the accompanying schematic drawings, in which.

SUMMARY OF THE INVENTION

The object of the present invention is realized by a motor vehicle seat having a first arresting device for the sitting position of the backrest, a second arresting device for the sitting position of the sitting portion, and a third arresting device, wherein the sitting portion and the backrest are biased into their cargo positions and the backrest, after release of the first arresting device, is pivoted in the direction toward the cargo position, and against the third arresting device, into a stand-by position, as a result of which the second arresting device is released and the sitting portion is pivoted into the cargo position, as a consequence of which the third arresting device is released and the backrest is pivoted out of the stand-by position into the cargo position.

With the motor vehicle seat of the present application, it is merely necessary to undertake an initial process, namely the release of the first arresting device, as a result of which the motor vehicle seat is automatically converted out of its sitting position into the cargo position. The inventive kinematics prevent the backrest and the sitting portion from colliding with one another during their movements.

Pursuant to further advantageous embodiments of the present invention, a release lever can be provided for the release of the second arresting device and for a fixation of the stand-by position of the backrest, wherein the release lever projects from the lower end of the backrest. The second arresting device can have a dual-arm retaining lever that is pivotably attached to a seat base via a pivot point, wherein a hook is formed on the free end of a first lever arm of the retaining lever, and wherein in the arresting position, the hook extends about a pin that is secured to the sitting portion.

The retaining lever can have a second lever arm that is pivotably connected, in a torque-transmitting manner, with a first lever arm of a dual arm transfer lever that is pivotably attached to the seat base via a pivot point and has a second lever arm that is disposed in the pivot path of the release lever which, during the pivoting of the backrest, applies a torque to the second lever arm of the transfer lever, wherein by means of the first lever arm of the transfer lever the torque is transferred to the retaining lever, so that the hook of the retaining lever comes free from the pin that is secured to the sitting portion and the sitting portion can pivot into the cargo position.

The third arresting device can have a stop or trip lever that is pivotably connected to the seat base via a pivot point and has an abutment surface that extends into the pivot path of the release lever. After release of the second arresting device, the release lever can rest against the abutment surface to fix the stand-by position of the backrest. A Bowden cable can be provided, by means of which the trip lever can be operatively connected with the sitting portion, either directly or via an articulation element, wherein by means of its pivoting into the cargo position, the sitting portion can apply tension to the trip lever via the Bowden cable, so that the abutment surface of the trip lever comes free from the release lever and the backrest can pivot into the cargo position.

Further specific features of the present invention will be described in detail subsequently.

DESCRIPTION OF SPECIFIC EMBODIMENTS

Referring now to the drawings in detail, the motor vehicle seat 1 has a backrest 2 and a sitting portion 3. By means of a first hinged lever or articulation element 4 and a further hinged lever or articulation element 5, the backrest 2, on both sides, is pivotably mounted to a seat base 6 that, for example, can be secured to a non-illustrated base of the vehicle body. Each of the articulation elements 4 and 5 has a lower pivot point 7 or 8 respectively with the seat base 6, and an upper pivot point 9 or 10 respectively with the backrest 4.

The sitting portion 3 is similarly pivotably mounted on the seat base 6, and for this purpose is provided on both sides with a hinged lever or articulation element 11 and a hinged lever or articulation element 12. The articulation elements 11 and 12 have a lower pivot point 13 or 14 respectively with the seat base 6, and an upper pivot point 15 or 16 respectively with the sitting portion 3. The positions of the pivot points 7 to 10 and 13 to 16 are selected such that the backrest 2 and the sitting portion 3 can be pivoted out of a sitting position on the seat base 6 (shown in FIG. 1), and into a cargo position (shown in FIG. 2). In the cargo position, the underside 17 of the sitting portion 3, and the rear side 18 of the backrest 2, are disposed in an essentially horizontal plane and thus offer an additional loading surface.

Figure 1:
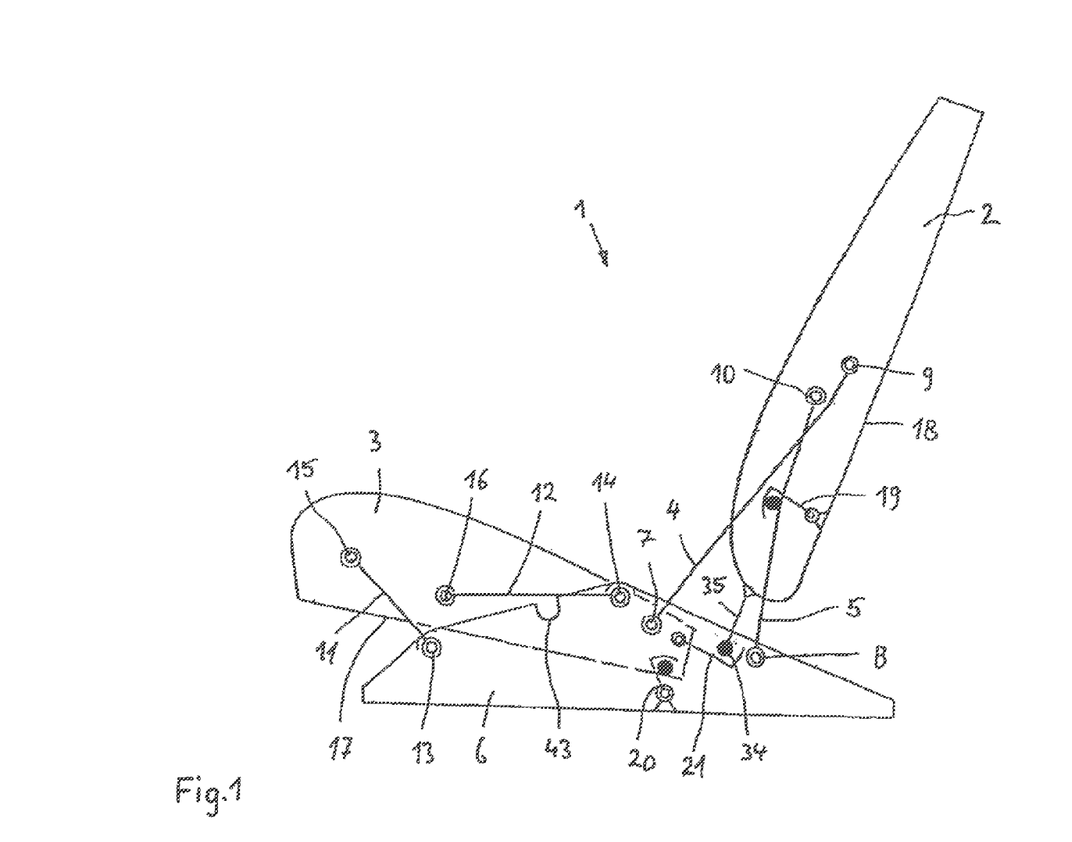
FIG. 1 is a side view of a motor vehicle seat in the sitting position.
Figure 2:
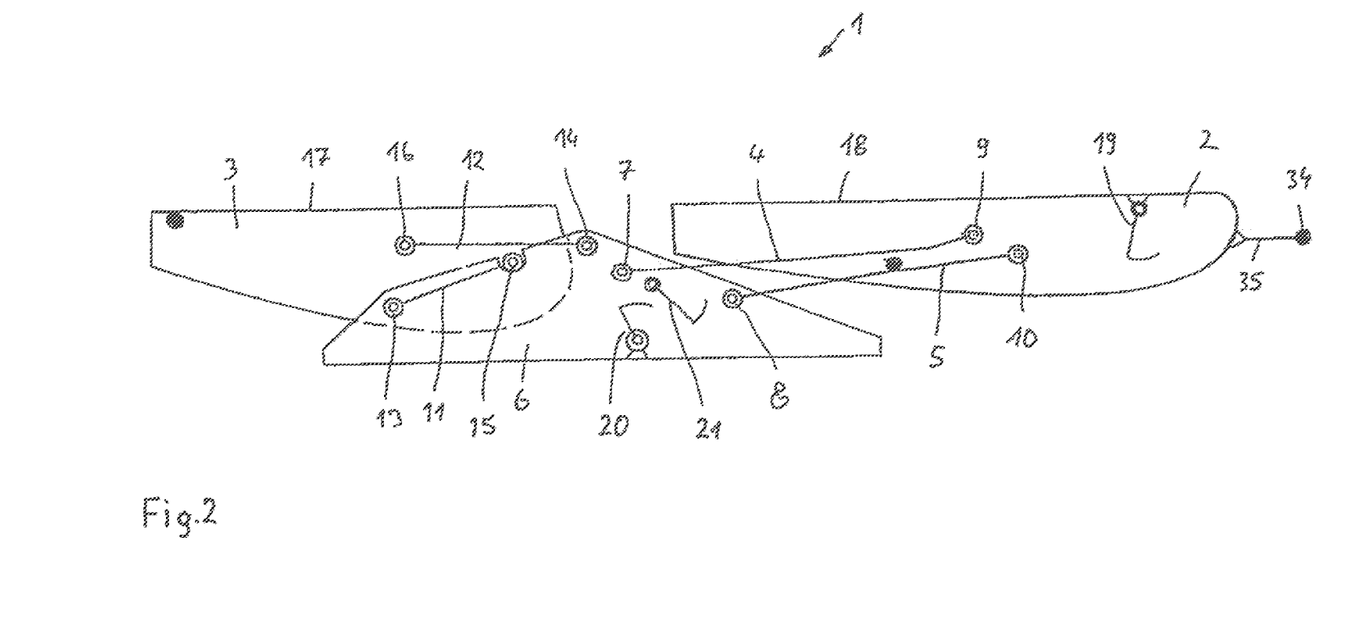
FIG. 2 is an illustration of the motor vehicle seat of FIG. 1 in the cargo position.
Figure 3:
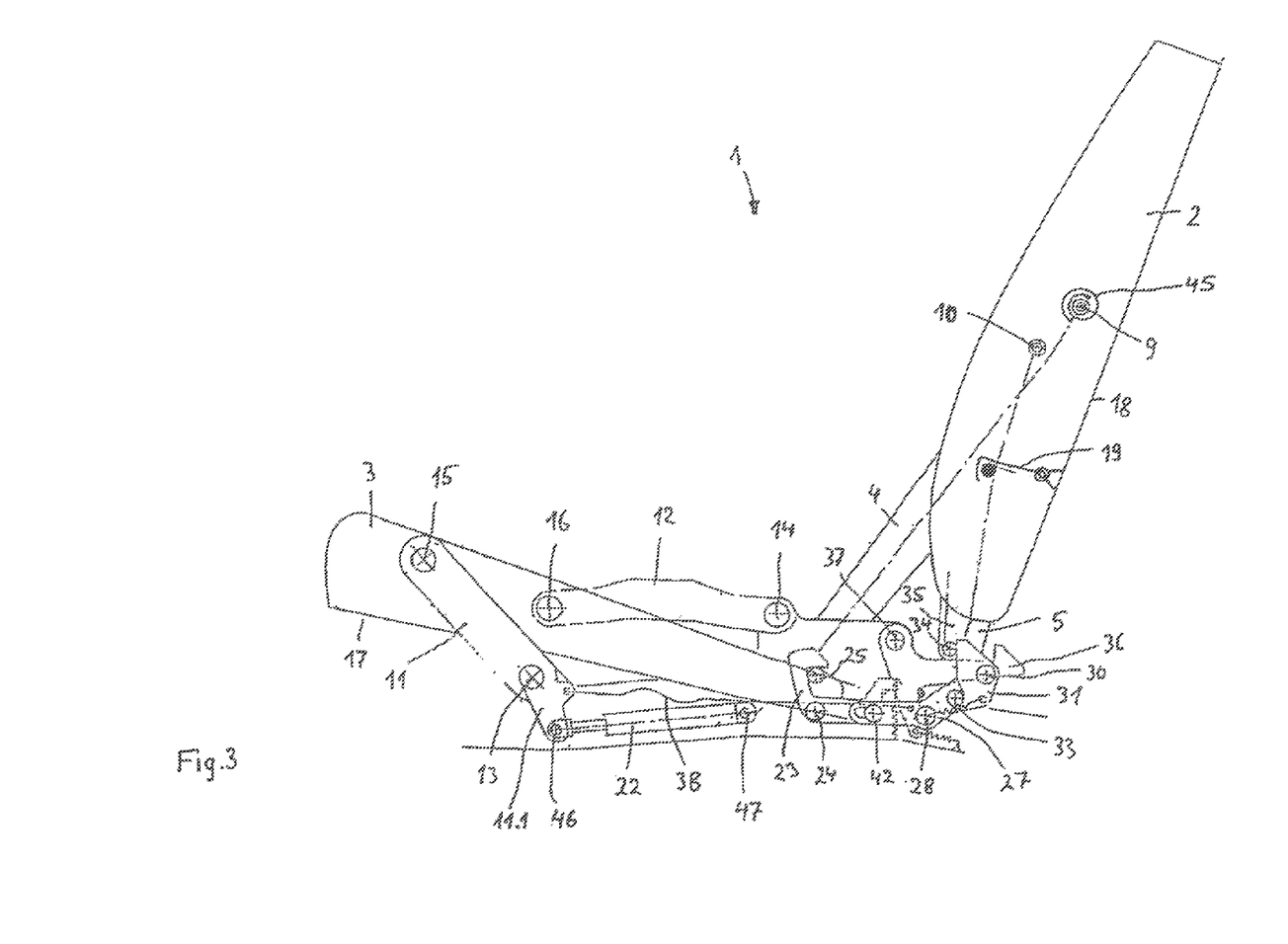
FIG. 3 shows the motor vehicle seat of FIG. 1 with a detailed illustration of the sitting portion while maintaining the schematic illustration of the backrest.
Figure 4:
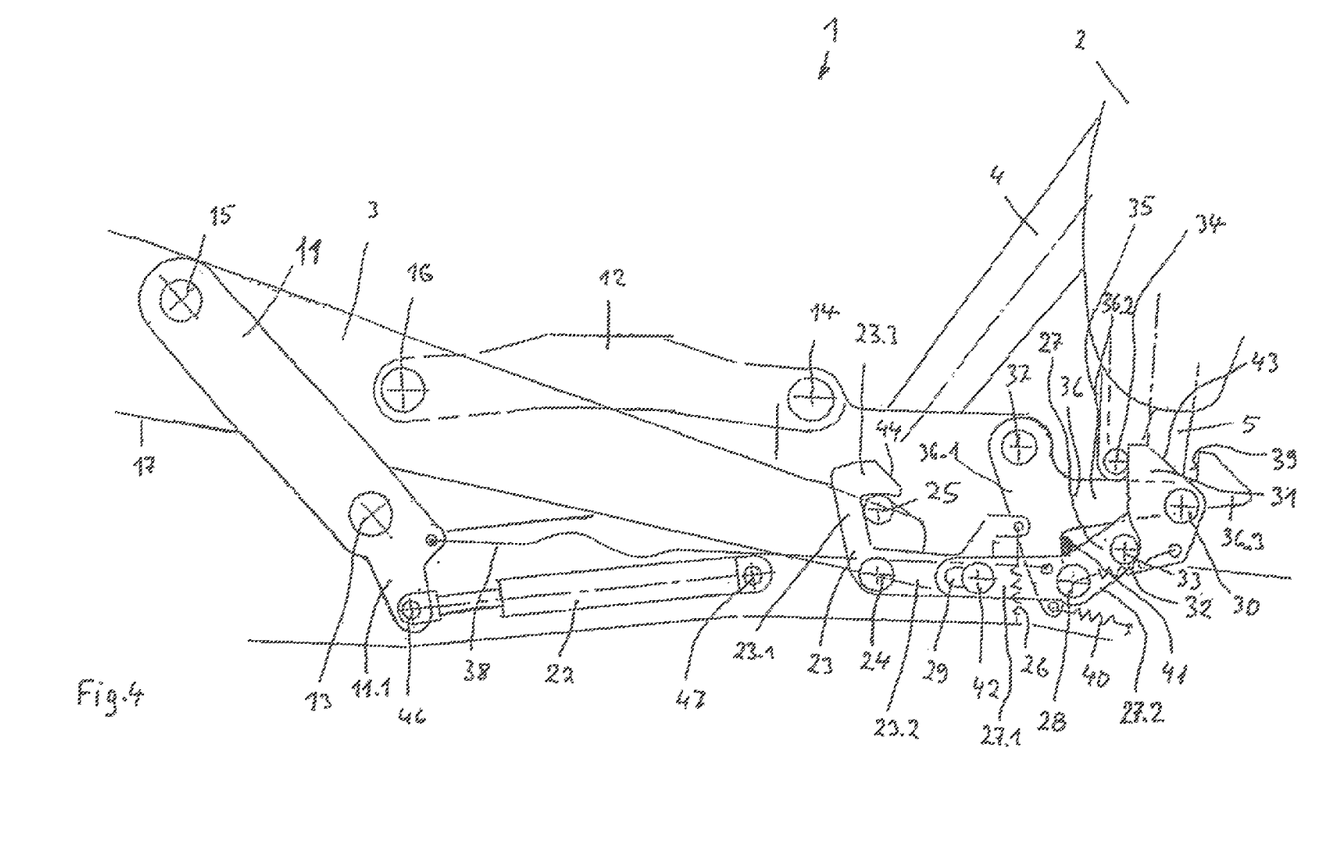
FIG. 4 is an enlarged view of a portion of the illustration of FIG. 3.

The motor vehicle seat 1 is furthermore provided with a first arresting device 19, a second arresting device 20, and a third arresting device 21, which are illustrated only schematically in FIGS. 1 to 3. The first arresting device 19 holds the backrest 2 in its sitting position, while the second arresting device 20 arrests the sitting portion 3 in its sitting position. The third arresting device 21 holds the backrest 2, after it has left its sitting position, in a stand-by position, which will be explained in greater details subsequently.

The backrest 2 and the sitting portion 3 are biased into their cargo position. For this purpose, a spring 45 (FIG. 3) is provided in the backrest 2, and is supported on the one hand on the pivot point 9 on the backrest and on the other hand on the articulation element 5. On the sitting portion 3, the biasing is carried out by a pneumatic spring 22, one end of which, via a pivot point 46, is pivotably connected with a rigid extension 11.1 of the hinged lever or articulation element 11, and the other end of the pneumatic spring 22, via a pivot point 47, is pivotably connected with the seat base 6.

The construction of the second and third arresting devices 20 and 21 will be explained subsequently.

The second arresting device 20 has a dual-arm retaining lever 23, which at the transition from its first lever arm 23.1 into its second lever arm 23.2, is pivotably attached to the seat base 6 via a pivot point 24. The free end of the first lever arm 23.1 is angled off in the form of a hook 23.3, which in the arresting position extends about a bolt 25 that is secured to the sitting portion 3, so that the sitting portion cannot pivot.

Mounted into the free end of the second lever arm 23.2 of the retaining lever 23 is one end of a spring 26, the other end of which is connected with the seat face 6. The spring 26 biases the retaining lever 23 into its arresting position. A bolt or pin 42 extends laterally from the free end of the second lever arm 23.2.

A dual-arm transfer lever 27 is also part of the second arresting device 20, and includes a first lever arm 27.1 and a second lever arm 27.2. At the transition from the first lever arm 27.1 to the second lever arm 27.2, the transfer lever 27 is pivotably attached to the seat base 6 via a pivot point 28. Formed at the free end of the first lever arm 27.1 is a slot 29, through which extends the pin 42 of the retaining lever 23. A retaining cam 31 is pivotably attached to the free end of the second lever arm 27.2 of the transfer lever 27 via a pivot point 30. One end of a spring 32 is mounted in the retaining cam 31, while the other end of the spring 32 is connected to the pivot point 28. The spring 32 pulls the retaining cam 31 against an abutment or stop 33 that is formed on the second lever arm 27.2 of the transfer lever 27, and that prevents a clockwise pivoting of the retaining cam 31 on the transfer lever 27.

When the backrest 2 is in a comfort or sitting position, that end of the retaining cam 31 that is opposite the attachment end for the tension spring 32 rests against a bolt or pin 34, or is slightly spaced therefrom. The pin 34 is formed on a release lever 35 that projects from the lower end of the backrest 2.

The third arresting device 21 has a T-shaped stop or trip lever 36, one free end of the transverse arm 36.1 of which is pivotably connected with the seat base 6 via a pivot point 37. Mounted on the other free end of the transverse arm 36.1 is a Bowden cable 38 that is connected to the extension 11.1 of the articulation element 11. The free end of the longitudinal arm 36.2 of the trip lever 36 is embodied as a hook 36.3. An abutment surface 39 of this hook 36.3 is disposed in the pivot path of the pin 34 that projects laterally from the release lever 35.

Also mounted in that free end of the transverse arm 36.1 in which the Bowden cable 38 is mounted is a tension spring 40, the other end of which is connected with the seat face 6. This tension spring 40 pulls the trip lever 36, against the tension effect of the Bowden cable 38, against an abutment pin 41 that is secured to the seat base 6, so that the position of the trip lever 36 is fixed when the backrest 2 is in the sitting position or in the stand-by position.

The conversion of the motor vehicle seat 1 out of its sitting position and into its cargo position will be described subsequently.

First of all, the first arresting device 19 is released. This can occur by a pulling action, for example on a non-illustrated draw or pull loop. Instead of such a manual release of the backrest 2, it is also possible to use, for example, an electrical linear control element, e.g. an electromagnet.

Figure 5:
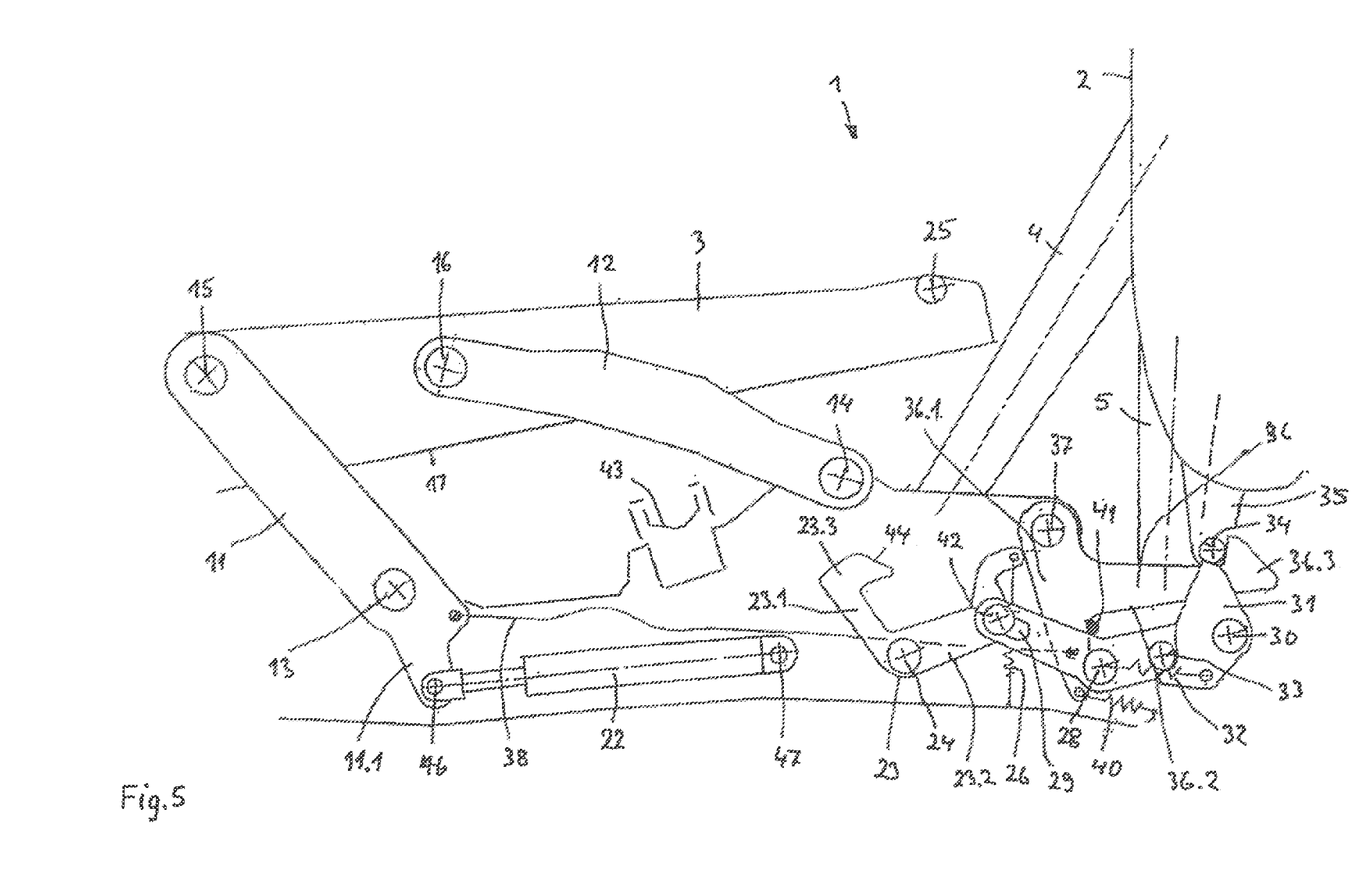
FIG. 5 is an illustration similar to that of FIG. 4 with the backrest in the stand-by position.
Figure 6:
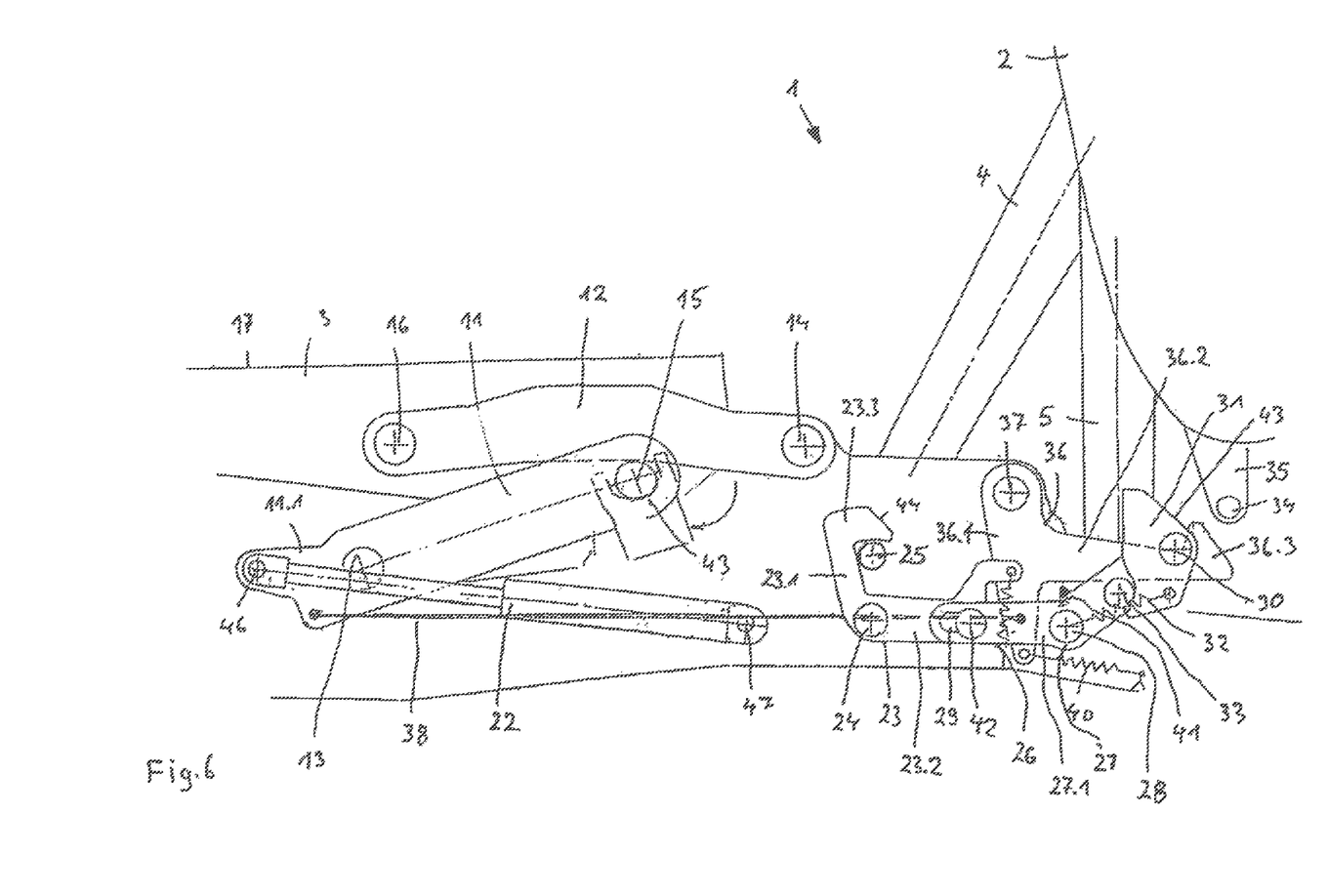
FIG. 6 is an illustration similar to that of FIG. 4 with the sitting portion in the cargo position.
Figure 7:
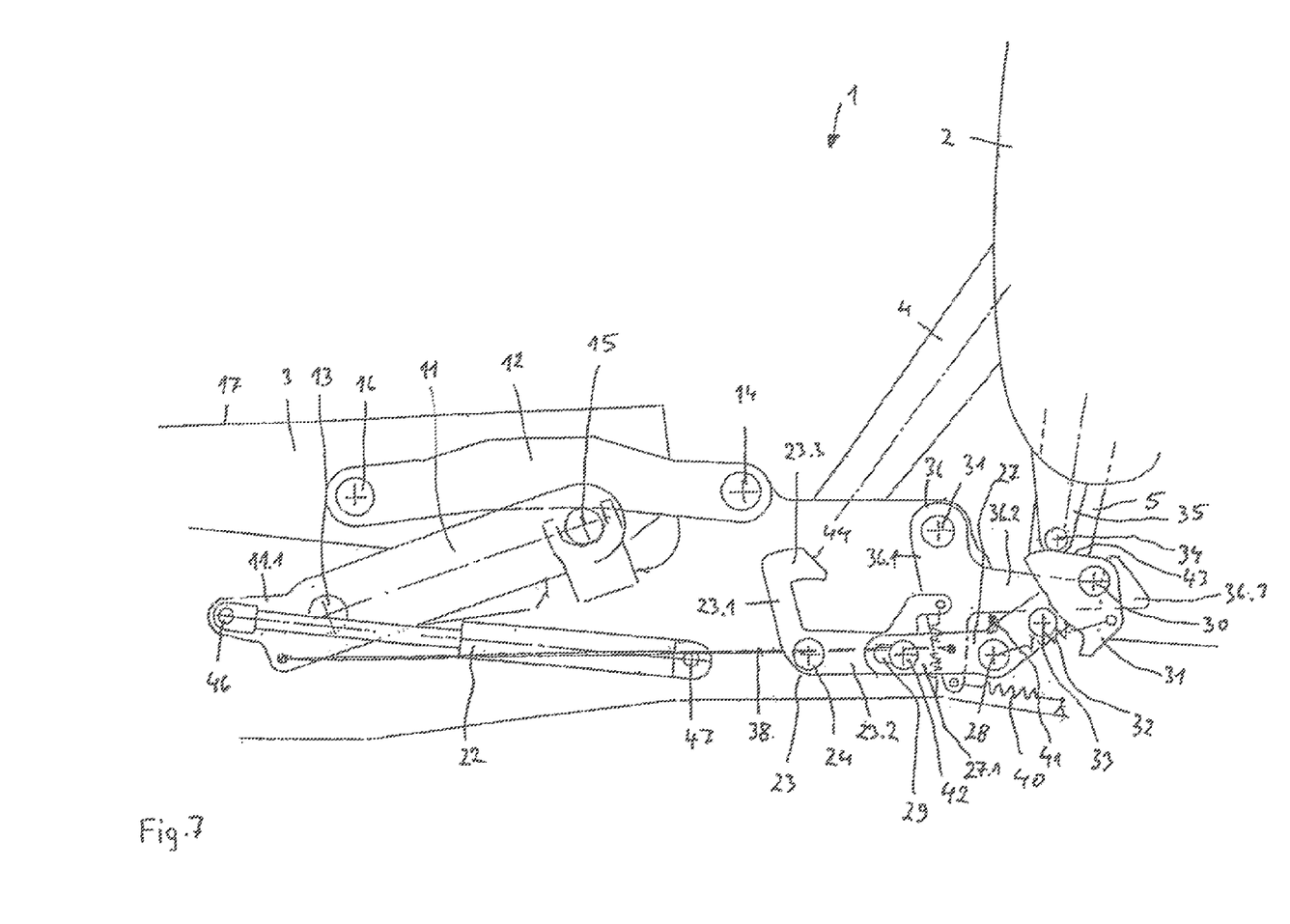
FIG. 7: is an illustration similar to that of FIG. 6 with the backrest returned to its sitting position.

After the backrest 2 is released, it pivots in a counterclockwise direction due to the biasing acting upon it. As a result, the pin 34 of the release lever 35 applies pressure on the retaining cam 31. Since due to the fact that it rests against the stop 33 the retaining cam 31 cannot pivot in the clockwise direction, torque acts upon the transfer lever 27, so that the latter pivots in the clockwise direction (FIG. 5). The lever arm 27.1 of the transfer lever 27 takes the retaining lever 23 along this pivot path counter to the tension effect of the spring 26; in so doing, the retaining lever 23 shifts in the slot 29 of the transfer lever 27, in other words, the retaining lever 23 rotates in a counterclockwise direction, as a result of which the hook 23.3 of the retaining lever 23 becomes free of the pin 25 that is secured to the sitting portion 3. As a result, the sitting portion 3, due to the pressure that acts upon the extension 11.1 of the articulation element 11 due to the pneumatic spring 22, and guided by its articulation elements 11 and 12, can pivot out of the sitting position and into the cargo position, which is illustrated in FIGS. 2, 6 and 7. In the cargo position, the underside 17 of the sitting portion 3 faces upwardly, and the upper pivot points 15 of the articulation elements 11 rest in fork-shaped supports 43 of the seat base 6 (see FIG. 6).

After the displacement of the retaining cam 31 (FIG. 5), the pin 34 of the release lever 35 comes into engagement against the abutment surface 39 of the trip lever 36. Since the retaining force of the tension spring 40 is greater than the biasing of the backrest 2, the latter can initially pivot no further; rather, the backrest 2 is held in the stand-by position that has been reached (FIG. 5), while the sitting portion 3 pivots into its cargo position.

As can be seen from FIG. 5, when the backrest 2 is in the stand-by position, the Bowden cable 38, which extends between the extension 11.1 of the articulation element 11 and the stop or trip lever 36, is slack, in other words, exerts no tension upon the trip lever 36. Due to the pivot movement of the articulation element 11 into the cargo position, the spacing between the two attachment points of the Bowden cable 38 becomes greater, so that finally, against the effect of the tension spring 40, tension is exerted upon the trip lever 36. As a consequence of this tension effect, the trip lever 36 pivots in a clockwise direction about its pivot point 37 with the seat base 6, so that the pin 34 of the release lever 35 comes free from the abutment surface 39 of the hook 36.3 (FIG. 6). As a result, due to the biasing acting upon the backrest 2, and guided by the articulation elements 4 and 5, the backrest 2 can pivot further in the clockwise direction into its cargo position. Since the pivot movements of the sitting portion 3 and the backrest 2 are effected one at a time, in other words successively, collisions of the two components during their pivoting movements are avoided.

The conversion of the motor vehicle seat 1 out of the cargo position and into the sitting position is effected in the reverse sequence. First, the backrest 2 is pivoted into its sitting position; during this pivoting movement, the pin 34 of the release lever 35 runs up on an inclined abutment surface 43 of the retaining cam 31, so that the latter pivots in a counterclockwise direction against the tension force of the tension spring 32, whereupon the pin 34 can readily pass.

Subsequently, the sitting portion 3 is pivoted into its sitting position. At the conclusion of this pivoting movement, the pin 25, which is secured to the sitting portion 3, runs up onto an inclined abutment surface 44 of the hook 23.3 of the retaining lever 23, as a result of which the retaining lever 23 pivots in a counterclockwise direction and finally the pin, which is secured to the sitting portion, catches behind the hook 23.3 of the retaining lever 23, so that the sitting portion 3 is again arrested. As a consequence of the pivoting of the sitting portion 3 out of the cargo position and into the comfort or sitting position, the Bowden cable 38 again becomes slack, so that the tension spring 40 can pull the trip lever 36 into engagement against the abutment pin 41. In so doing, the sitting position of the motor vehicle seat 1 is again achieved.

The specification incorporates by reference the disclosure of German priority document 10 2010 023 546.6 filed Jun. 11, 2010.

The present invention is, of course, in no way restricted to the specific disclosure of the specification and drawings, but also encompasses any modifications within the scope of the appended claims.

What I claim is:

1. A motor vehicle seat, comprising:
    a sitting portion;
    a backrest, wherein said sitting portion and said backrest are adapted to be converted out of a respective sitting position into a cargo position in which said sitting portion and said backrest are substantially disposed in a common horizontal plane;
    a first arresting device for the sitting position of said backrest;
    a second arresting device for the sitting position of said sitting portion;
    a third arresting device; and
    means for biasing said sitting portion and said backrest into their cargo positions, wherein said first arresting device is configured to be releasable for pivoting of said backrest, in a direction toward its cargo position, and counter to said third arresting device, into a stand-by position, as a consequence of which said second arresting device is adapted to be released for pivoting of said sitting portion into its cargo position, as a consequence of which said third arresting device is adapted to be released for pivoting of said backrest out of its stand-by position and into its cargo position; and
    a release lever for release of said second arresting device and a fixation of the stand-by position of said backrest, wherein said release lever projects from a lower end of said backrest.

2. A motor vehicle seat according to claim 1, which includes a seat base, wherein said second arresting device has a dual-arm retaining lever that is provided with a first lever arm, further wherein said retaining lever is pivotably attached to said seat base via a pivot point, further wherein a hook is formed on a free end of said first lever arm of said retaining lever, further wherein a pin is secured to said sitting portion, and wherein in an arresting position of said second arresting device, said hook extends about said pin.

3. A motor vehicle seat according to claim 2, which includes a transfer lever that has a first lever arm and is pivotably attached to said seat base via a pivot point, wherein said retaining lever has a second lever arm that is pivotably connected, in a torque-transmitting manner, with said first lever arm of said transfer lever, further wherein said transfer lever has a second lever arm that is disposed in a pivot path of said release lever, further wherein during pivoting of said backrest, said release lever is configured to apply a torque to said second lever arm of said transfer lever, and wherein the torque is applied to said retaining lever via said first lever arm of said transfer lever, so that said hook of said retaining lever comes free from said pin that is secured to said sitting portion and said sitting portion can pivot into the cargo position.

4. A motor vehicle seat according to claim 1, wherein said third arresting device is provided with a trip lever that is pivotably attached to said seat base via a pivot point, and wherein said trip lever has an abutment surface that is configured to extend into a pivot path of said release lever.

5. A motor vehicle seat according to claim 4, wherein after a release of said second arresting device, said release lever rests against said abutment surface of said trip lever to fix the stand-by position of said backrest.

6. A motor vehicle seat according to claim 5, which includes a Bowden cable that operatively connects said trip lever with said sitting portion, either directly or via the interposition of an articulation element, and wherein said sitting portion, by means of a pivoting into the cargo position, applies tension to said trip lever via said Bowden cable, so that said abutment surface of said trip lever comes free from said release lever and said backrest can pivot into the cargo position.

\* \* \* \* \*